US008400735B2

(12) United States Patent
Dieny et al.

(10) Patent No.: US 8,400,735 B2
(45) Date of Patent: Mar. 19, 2013

(54) MAGNETIC RECORDING MEDIUM

(75) Inventors: Bernard Dieny, Lans En Vercors (FR);
Jérôme Moritz, Saint Pierre de
Bressieux (FR); Bernard Rodmacq,
Veurey Voroize (FR)

(73) Assignees: Commissariat à l'Énergie Atomique et aux Énergies Alternatives, Paris (FR);
Centre National de la Recherche Scientifique, Paris (FR)

( * ) Notice: Subject to any disclaimer, the term of this patent is extended or adjusted under 35 U.S.C. 154(b) by 357 days.

(21) Appl. No.: 12/743,671

(22) PCT Filed: Nov. 20, 2008

(86) PCT No.: PCT/EP2008/065887
§ 371 (c)(1),
(2), (4) Date: Jun. 17, 2010

(87) PCT Pub. No.: WO2009/068466
PCT Pub. Date: Jun. 4, 2009

(65) Prior Publication Data
US 2010/0284104 A1    Nov. 11, 2010

(30) Foreign Application Priority Data

Nov. 26, 2007  (FR) ...................... 07 59324

(51) Int. Cl.
*G11B 5/66* (2006.01)
*G11B 5/738* (2006.01)
(52) U.S. Cl. ...................... 360/135; 428/828; 428/828.1
(58) Field of Classification Search .................. 360/135;
428/827, 828, 828.1, 829, 830
See application file for complete search history.

(56) References Cited

U.S. PATENT DOCUMENTS

| | | | | |
|---|---|---|---|---|
| 5,347,408 A | * | 9/1994 | Gohda et al. | 360/65 |
| 5,458,987 A | * | 10/1995 | Sato et al. | 428/820.6 |
| 6,391,430 B1 | * | 5/2002 | Fullerton et al. | 428/212 |
| 6,865,044 B1 | * | 3/2005 | Albrecht et al. | 360/59 |
| 6,947,235 B2 | * | 9/2005 | Albrecht et al. | 360/55 |
| 7,068,452 B2 | * | 6/2006 | Ogawa et al. | 360/55 |
| 7,282,278 B1 | * | 10/2007 | Nolan | 428/831.2 |
| 7,881,014 B2 | * | 2/2011 | Lim et al. | 360/135 |
| 7,911,739 B2 | * | 3/2011 | Jubert | 360/135 |

(Continued)

FOREIGN PATENT DOCUMENTS

| FR | 2859306 | 3/2005 |
|---|---|---|
| WO | WO 2006/135034 | 12/2006 |

OTHER PUBLICATIONS

International Search Report for PCT/EP2008/065887.

(Continued)

*Primary Examiner* — Will J Klimowicz
(74) *Attorney, Agent, or Firm* — Pillsbury Winthrop Shaw Pittman, LLP

(57) ABSTRACT

The present invention relates to a magnetic recording medium (100). The invention finds a particularly interesting application in the field of data stored on hard disks. The medium (100) comprises an assembly of magnetic zones disposed on a substrate (102), each magnetic zone comprising at least one first (C'1) and one second (C'2) stacked magnetic layers separated from each other by a non-magnetic layer (NM'). In addition, said first magnetic layer (C'1) presents magnetization substantially oriented parallel to the plane of said substrate (102) and said second magnetic layer (C'2) presents magnetization substantially oriented perpendicular to the plane of said substrate (102).

18 Claims, 7 Drawing Sheets

U.S. PATENT DOCUMENTS

| | | | |
|---|---|---|---|
| 7,936,598 B2* | 5/2011 | Zheng et al. | 365/173 |
| 7,974,031 B2* | 7/2011 | Dobin et al. | 360/44 |
| 8,021,769 B2* | 9/2011 | Berger et al. | 428/827 |
| 8,031,425 B2* | 10/2011 | Jubert | 360/59 |
| 8,085,502 B2* | 12/2011 | Jubert | 360/135 |
| 8,107,194 B2* | 1/2012 | Jubert | 360/135 |
| 8,163,405 B2* | 4/2012 | Hauet et al. | 428/828.1 |
| 8,213,119 B2* | 7/2012 | Jubert | 360/135 |
| 8,228,636 B2* | 7/2012 | Lomakin et al. | 360/135 |
| 2002/0136930 A1 | 9/2002 | Oikawa et al. | |
| 2005/0053803 A1* | 3/2005 | Umeda et al. | 428/694 T |
| 2006/0222896 A1* | 10/2006 | Inomata et al. | 428/826 |
| 2006/0280975 A1 | 12/2006 | Albrecht et al. | |
| 2010/0284104 A1* | 11/2010 | Dieny et al. | 360/55 |

OTHER PUBLICATIONS

Shouheng Sun, et al., "Monodisperse FePt Nanoparticles and Ferromagnetic FePt Nanocrystals Superlattices", Science vol. 287, pp. 1989-1992, Mar. 17, 2000; www.sciencemag.org.

S. Landis et al., "Magnetic properties of Co/Pt multilayers deposited on silicon dot arrays", Physical Review B, vol. 62, No. 18, pp. 12271-12281, Nov. 1, 2000.

* cited by examiner

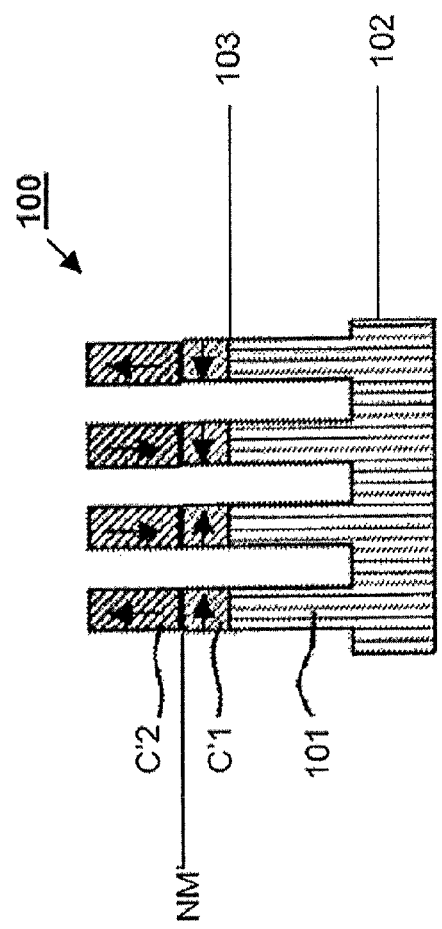
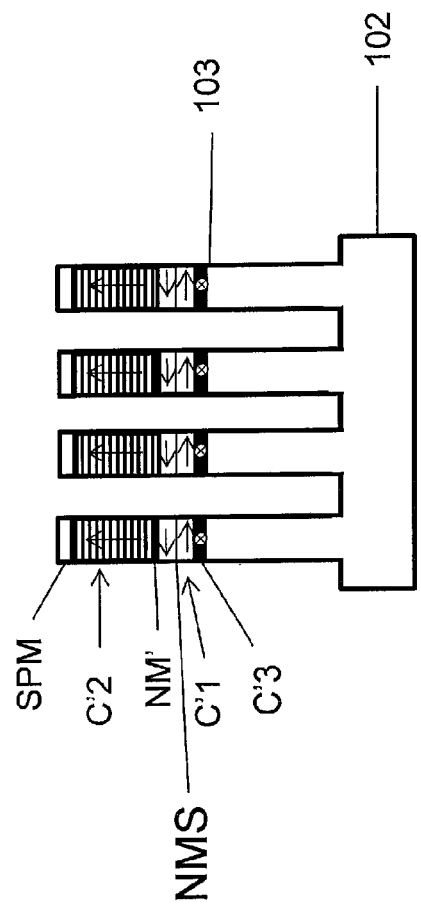
Figure 2
Figure 2a

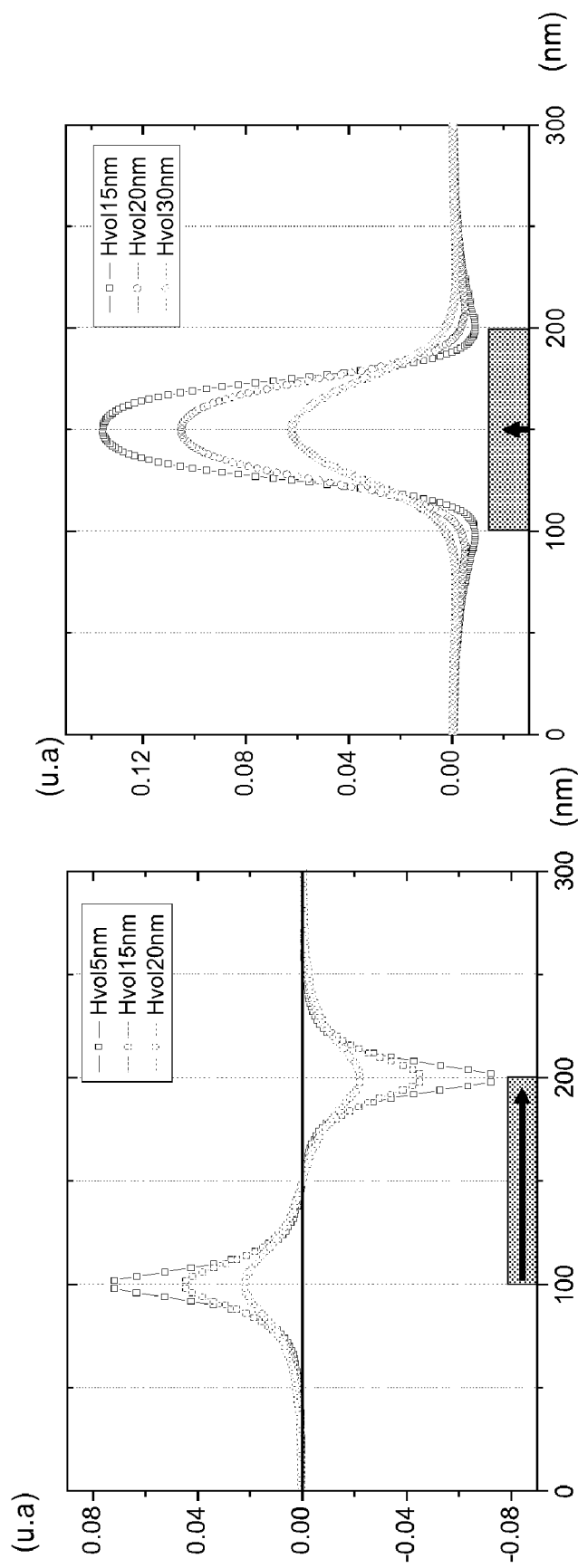

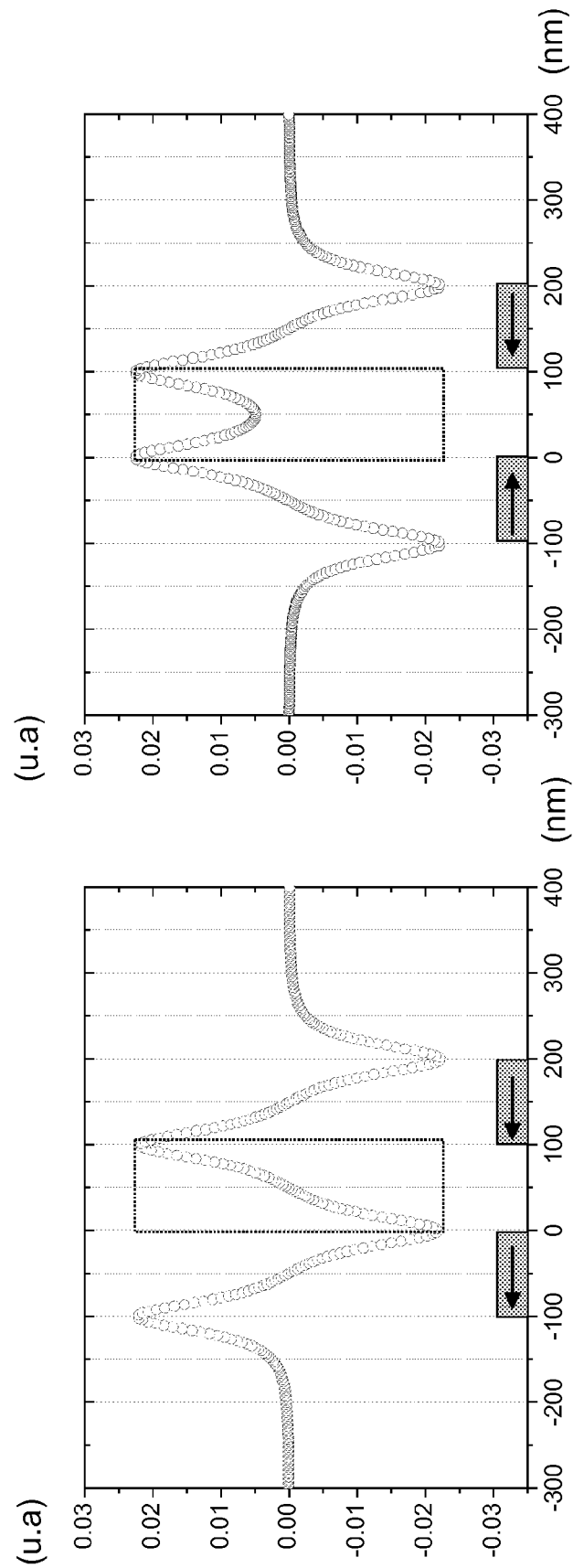

MAGNETIC RECORDING MEDIUM

CROSS-REFERENCE TO RELATED APPLICATIONS

This is the U.S. National Stage of PCT/EP2008/065887, filed Nov. 20, 2008, which in turn claims priority to French Patent Application No. 0759324, filed Nov. 26, 2007, the entire contents of all applications are incorporated herein by reference in their entireties.

The present invention relates to a magnetic recording medium. The invention finds a particularly interesting application in the field of data storage on hard disks.

Magnetic recording remains the most reliable and economical technique to reversibly store and reread massive quantities of data in binary form. Magnetic recording is based on the use of magnetic layers whose properties are optimized for maximum writing density and so that the writing and reading processes are effective and the information stored has a sufficient and predictable lifetime (typically 10 years).

The storage density of computer hard disks, that is, magnetic recording media, has increased at a rate of 60% per year for about fifteen years. In 50 years, the storage capacity has gone from 2 Kbits/in$^2$ to close to 400 Gbits/in$^2$ (1 in=2.54 cm).

Currently, magnetic recording media are most often continuous media comprising at least one magnetically sensitive layer, deposited on a substrate generally fabricated in an aluminum alloy or glass.

Today, this sensitive layer is comprised of a continuous polycrystalline alloy film, CoPtCrX, with an hcp hexagonal close-packed structure presenting high magnetocrystalline anisotropy along the c axis (known as the easy axis) oriented either in the plane, or in the direction perpendicular to the plane. This layer is formed from a multitude of crystallites of nanometric size. The additional X elements are either Ta or P or B, and act on decoupling of grains and/or on their orientation. The object of Pt is to reinforce the magnetic anisotropy of the medium. Current data densities are on the order of 150 Gbit/in$^2$; the size of crystallites is on the order of 8 nm and tends to decrease inasmuch as the storage capacity increases. Each bit of data typically comprises a hundred grains (i.e., the size of a bit typically corresponding to 200 nm×40 nm) and the orientation of their mean magnetization defines the binary value 0 or 1. The anisotropy of these storage layers is thus uniaxial and the stability of written data depends on the amplitude of the latter, on the magnetization of the media (because of demagnetizing field effects), and on the size of the grains.

In order to increase the storage density, in a known fashion, the size of a data bit must be reduced. Today we have reached bit sizes on the order of 150 nm×30 nm and diminishing aspect ratios (aspect ratio of the magnetic domain representing a data bit) to strive for a ratio of between 4 and 5, the number of grains per bit being approximately one hundred.

However, to maintain a sufficient signal-to-noise ratio, a bit must not have fewer than 50 grains (if not, the statistical bit-to-bit fluctuations become excessive) and the layers must have large enough magnetization.

One solution may be to reduce the grain size, the number of grains per bit remaining greater than or equal to 50 to maintain a sufficient signal-to-noise ratio during reading.

However, as with Moore's law in the semiconductor component field, reducing grain size has a physical limit known as the superparamagnetic limit. If volume V of grains becomes too small, such that KV<40 $k_BT$, where $k_B$ is the Boltzmann constant, T the temperature and K the magnetocrystalline anisotropy, the data becomes unstable (remember that the stability criterion is about ten years). In this case, the data bits (that is to say, the magnetization direction of the magnetic grains), or the transitions between bits, are disoriented under the combined action of demagnetizing fields and thermal fluctuations and the value stored is lost. Superparamagnetism appears for densities on the order of 200 Gbits/in$^2$ with the usual planar magnetization media.

A first solution for pushing further the superparamagnetic limit consists in choosing a material presenting higher magnetocrystalline anisotropy.

However, by increasing the magnetocrystalline anisotropy of a material, the coercive field of the material also increases. It then becomes difficult to write data since the field that one may produce with a write head is limited by the saturation magnetization of the materials comprising the polar pieces of the head. This increase may become prohibitive since the write field values necessary at ambient temperature for writing data in a few nanoseconds may become greater than the magnetic field that is known to be produced with a write head (typically on the order of 1.7-1.8 T). The passage to media with magnetization perpendicular to the plane with an underlayer of soft materials (such as an NiFe alloy for example) allows the efficiency of the writing to be increased by further concentrating the field lines under the write pole of the head and thus shifting the superparamagnetic limit a little. In addition, research in progress on heat assisted recording aims to temporarily lower the magnetic anisotropy of the media by heating the latter locally just during the write time and by ensuring good thermal stability when the media goes back to ambient temperature. Research is also in progress for attempting to assist writing by radiofrequency waves.

However, these solutions are sometimes difficult to implement technologically.

A second solution proposed for several years consists of using another type of magnetic recording medium, known as a discrete medium, comprising an assembly of distinct, that is, physically separated (i.e., decoupling of the sensitive layer into nanometric magnetic dots) magnetic zones. In all discrete media, the elementary data bit is reduced to the size of a zone (dot). Thanks to the spacing between the zones, the bits are decoupled from each other. It may be possible to have a single grain per bit and thus grains that are much bigger than in the case of continuous media, which pushes back the problem of the superparamagnetic limit and facilitates the choice of materials. Contrary to granular continuous media, in this type of system, the width of the transitions between bits is no longer linked to the granularity of the media (that is to say, the grain size) but to the physical separation between dots defined by the nanostructuring of the media. The anticipated densities for this new technology are situated beyond 0.5 Tbit/in$^2$, that is to say, a periodicity of dots of less than 35 nm.

Different methods for obtaining discrete media are currently being studied. Some are based on the phenomena of self-organization of assemblies of magnetic nanostructures (cf. Monodisperse FePt nanograins and ferromagnetic FePt nanocrystal superlattices, S. Sun et al., Science 287 (2000) 1989). These methods allow good regularity at the local scale (typically 1 micron) to be obtained, but the density of defects at the large scale (on the order of 1 cm) is much too large with relation to the demands required by magnetic storage at ultrahigh density. Other techniques are based on direct nanostructuring by electronic or focused electron beam lithography of the magnetic layer, but these techniques are costly, slow to implement and unsuitable for large surfaces.

Another method for obtaining discrete media is proposed in the article "Magnetic properties of Co/Pt multilayers deposited on silicon dots arrays" (Phys. Rev. B, 62, 12271 (2000) S. Landis et al.). This method uses an array of pre-etched silicon dots: this array is obtained by nanoimprinting or by any other lithographic method. The nanoimprinting technique consists of making a mold that contains the impression of that which one wishes to make. Then one just places a layer of polymer resist on the smooth substrate, presses the mold against the resist such that the shape of the dots is transferred into the resist, and then removes the mold. An etching step then allows the patterns printed in the resist to be transferred into the substrate. The resist is then removed chemically or under the action of a plasma. The magnetic material is then deposited on the tops of the thus pre-etched silicon dots. No lithography or etching step is necessary after deposition of the magnetic material. A certain advantage is the decoupling of the nanostructuring steps from the deposition steps, making the process more versatile. A second great advantage is the use of nanoimprinting that allows rapid and inexpensive replication of structures on large surfaces (typically a disk of 3.5 inches in diameter), a technique that is easily transposable in the industrial field. Current studies take an interest in depositions by magnetron sputtering of the magnetic layer on arrays of dots on naturally surface oxidized silicon. Each layer is formed alternately of sublayers or "multilayers" of Pt and Co of the Pt/(Co/Pt)$_n$ type or of PtCo or FePt alloys (of high perpendicular anisotropy) on arrays of Si/SiO$_2$ dots. These systems have two stable magnetization states on each dot perpendicular to the plane of the layer: "upward" magnetization or "downward" magnetization. Other materials may also be used for these out-of-plane magnetization discrete media: these may be CoPtCrX alloys of hexagonal structure with their c axis oriented out-of-plane, or ordered alloys of L$_{10}$ structure, such as FePt, or even multilayers comprised of alternate layers of Co and Ni (for example Cu0.3 nm/Ni0.3 nm). The use of discrete media would allow storage capacities greater than Terabit/in$^2$ (1000 Gbit/in$^2$ i.e., a 2.5 factor with relation to continuous media corresponding to a periodicity of 25 nm dots) to be obtained. The storage capacity of discrete media is, however, limited by the magnetic dot manufacturing processes.

In order to increase storage capacity, patent application FR2859306 proposes using discrete media as multilevel supports. Traditional discrete storage is binary storage in which each dot may only take two possible magnetic states (i.e., 1 dot=1 bit). Multilevel storage ensures that each dot may take more than two possible magnetic states so as to carry data greater than 1 bit. To do this, a possibility already proposed consists of stacking on each dot N(N>1) layers presenting different coercive properties in order to store more than two states on the same structure, and also to multiply the densities. Such a configuration 10 is illustrated in FIG. 1. Substrate 2 comprises an array of separate submicronic dots 1. A magnetic zone is disposed on the top 3 of each of dots 1; two adjacent magnetic zones are then separated by a space corresponding to the dot spacing. Each magnetic zone is comprised of the stacking of a first magnetic layer C1 and a second magnetic layer C2, respectively having different coercive fields Hc1 and Hc2 and different remanent magnetic moments (defined as the product of the remanent magnetization by the magnetic volume of the relevant layer) values m1 and m2. Magnetic layers C1 and C2 are uncoupled or weakly coupled and have a magnetic anisotropy axis A1 (easy magnetization axis) preferentially oriented perpendicularly to substrate 2 and are separated by a non-magnetic layer NM. The magnetic moment m of each magnetic zone is then the sum of the magnetic moments of the first and second corresponding layers C1 and C2. The magnetizations of magnetic layers C1 and C2 of a magnetic zone may be oriented in the same direction (in parallel) or in an opposite direction (in antiparallel). The remanent magnetic moment m of each zone may thus take two different absolute values |m| and two different orientations, respectively positive and negative. Thus, the magnetic moment m of each magnetic zone may take four different values. The magnetic moment m of each zone thus allows data coded over four values to be represented.

However, the implementation of such a multilevel approach poses a number of difficulties.

Thus, a first difficulty resides in the implementation of writing on the recording medium. In fact, the writing method, that is to say the magnetization method of the selected magnetic zone of said medium, supposes a relatively complex application sequence of the magnetic writing field necessitating two successive steps, with two successive magnetic fields H, of decreasing absolute value. In a first step, a magnetic field H greater than Hc2 is applied, changing the orientation of magnetizations of two layers C1 and C2, the coercive field Hc2 being greater than the coercive field Hc1. Then, a second applied magnetic field H, larger than Hc1 but smaller than Hc2, allows to select the direction of the magnetization of the first magnetic layer C1. The magnetic fields H are applied along the direction of the easy magnetization axis A1.

In addition, a second difficulty resides in the implementation of reading on the recording medium. The reading method in fact requires performing effective discrimination between different stray field values and consequently necessitates a read head presenting very good sensitivity.

In this context, the object of the present invention is to provide a magnetic recording medium aiming to be free from the aforementioned problems while allowing an increase in storage density.

For this purpose, the invention proposes a magnetic recording medium comprising an assembly of magnetic zones disposed on a substrate, each magnetic zone comprising at least a first and a second magnetic layer that are separated from each other by a non-magnetic layer, said medium being characterized in that:
  said non-magnetic layer is a layer to ensure magnetic decoupling between said first and second magnetic layers;
  said first magnetic layer presents magnetization oriented substantially parallel to the plane of said substrate;
  said second magnetic layer presents magnetization oriented substantially perpendicular to the plane of said substrate;
Said magnetization orientations of said first and second magnetic layers allow data coded on four values per zone to be represented.

The magnetic recording medium according to the invention may also present one or more of the characteristics below, taken individually or according to all technically possible combinations:
  said second perpendicular magnetization layer is situated above said first parallel magnetization layer.
  said first magnetic layer is a single layer made from one of the following alloys:
    a CoPt or CoPd or CoFeNi alloy;
    a FePt or FePd chemically ordered alloy;
    a CoCr or CoPtCr or CoPtCrX where X designates Ta or P or B;
  said first magnetic layer is formed by two magnetic sublayers with antiparallel magnetization separated by a non-magnetic sublayer made of a material such as Ru able to induce antiferromagnetic coupling between the two adjacent sublayers;

the thicknesses of said magnetic sublayers are preferably different said second magnetic layer is a magnetic multilayer;

said magnetic multilayer is a cobalt/platinum multilayer of general form (Co/Pt)m or a cobalt/palladium multilayer of general form (Co/Pd)n or a (Co/Ni)p multilayer, m, n and p designating integer numbers corresponding to the number of respective repetitions of Co/Pt, Co/Pd and Co/Ni bilayers;

said second magnetic layer is a single layer made from one of the following alloys:
  a CoPt or CoPd alloy;
  a FePt or FePd chemically ordered alloy;
  a CoCr or CoPtCr or CoPtCrX alloy where X designates Ta or P or B;

said non-magnetic layer is made from a material chosen from among the non-magnetic metals such as Pt, Cr, Ru or Cu or oxides such as $Al_2O_3$, MgO, $HfO_2$ or $Ta_2O_5$;

said first magnetic layer is a layer of CoPtCr, said non-magnetic layer is a layer of Pt and said second magnetic layer is a Co/Pt multilayer;

each magnetic zone comprises a planar magnetization soft magnetic layer with a thickness of less than the thicknesses of said first and second magnetic layers, said soft layer being situated above or below said second layer and being magnetically exchange-coupled to said second layer to facilitate writing in said second layer;

said substrate comprises a dot assembly, each magnetic zone respectively being disposed on the top of each dot;

said recording medium comprises a plurality of concentric read/write tracks on which said magnetic zones are positioned, each track being distant from the following by a predetermined space;

each of said first parallel magnetization layers presents a magnetization orientation along the track to which said first layer belongs;

each of said magnetic zones comprises a third layer presenting magnetization oriented substantially parallel to the plane of said substrate and perpendicular to the magnetization orientation of said first layer, that is to say, perpendicular to the direction of head scanning.

Another object of the present invention is a method of reading a magnetic recording medium according to the invention via a read head and comprising the following steps:
  passage of said read head right above a succession of adjacent magnetic zones;
  detection by said read head of the vertical component of the field radiated during said passage;
  determination of the value of the bit corresponding to said second magnetic layer of the different successive magnetic zones from the form of the signal of the vertical component obtained right above these different successive magnetic zones;
  determination of the value of the bit corresponding to said first magnetic layer of the different successive magnetic zones from the form of the signal of the vertical component obtained between the different successive magnetic zones.

Another object of the present invention is a method of magnetization of magnetic zones of a recording medium according to the invention by a write head comprising a front polar piece and a rear polar piece, said method including the following steps, for each of said zones to be addressed:

said first magnetic layer is magnetized during the passage of the gap of said write head right above said magnetic zone;

said second magnetic layer is magnetized during the passage of the rear polar piece "trailing edge" right above said magnetic zone.

Other characteristics and advantages of the invention will emerge clearly from the description given below, for indicative and in no way limiting purposes, with reference to the attached figures, among which:

FIG. 2 is a simplified schematic representation of a magnetic recording medium according to the invention, FIG. 2a is a simplified schematic representation of a magnetic recording medium according to an embodiment of the invention;

Figure 5:
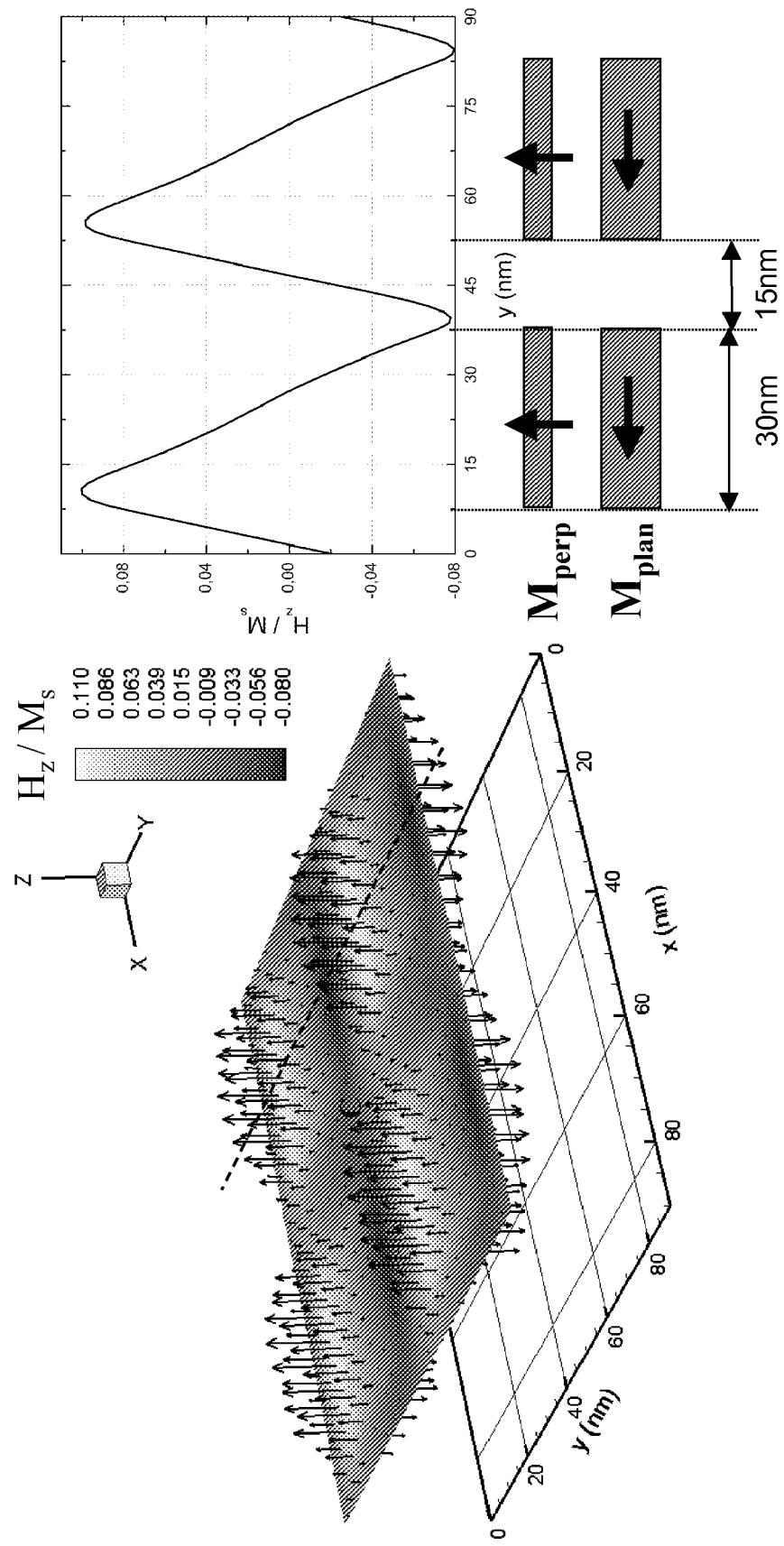
Figure 6:
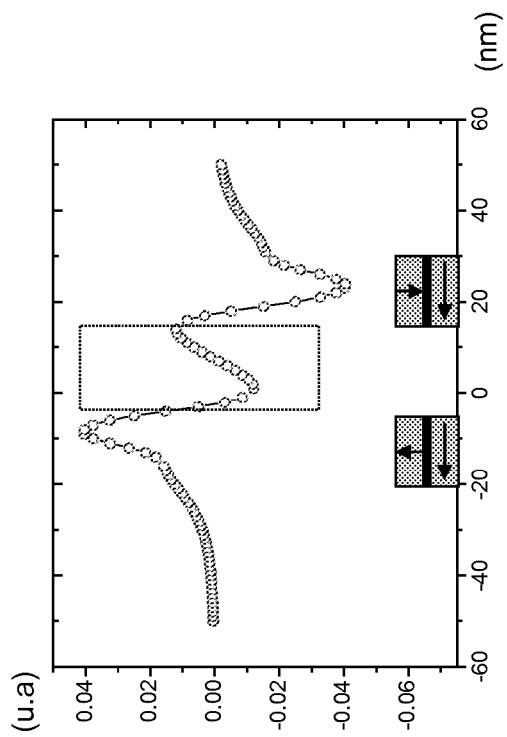
Figure 6:
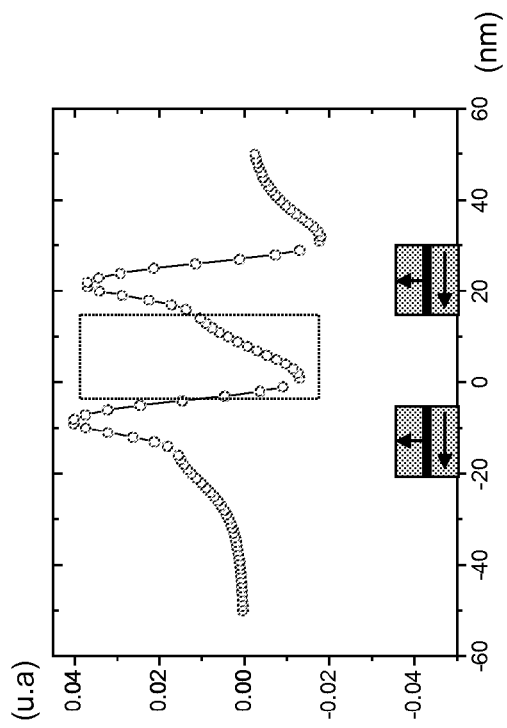
Figure 6:
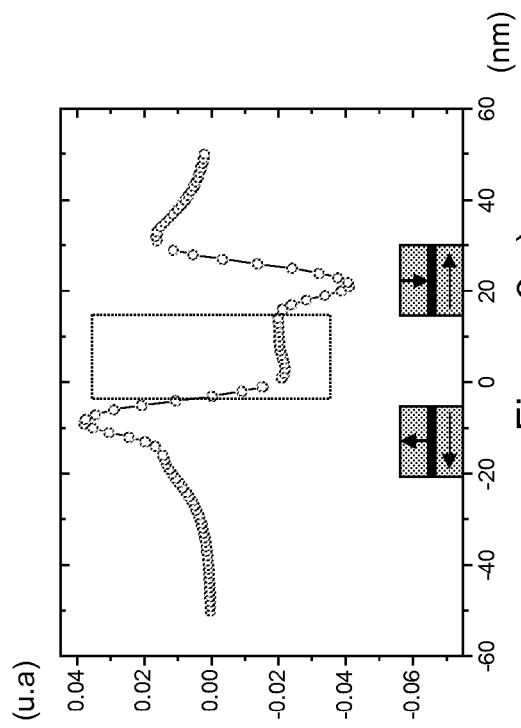

FIGS. 3 a) and 3 b) represent the vertical stray field of a dot with planar and perpendicular magnetization respectively, FIG. 4 represents the vertical components of the stray fields calculated for two adjacent dots with planar magnetization and for parallel (FIG. 4 a)) and antiparallel (FIG. 4b)) configurations of these two adjacent planar bits, FIG. 5 represents a three-dimensional view of the vertical component of the leakage field of a set of four magnetic dots from a recording medium according to the invention FIGS. 6a) to 6c) each represent a stray field signal form calculated in the case of two successive dots of a same track on a recording medium according to the invention, for three different configurations.

Figure 7:
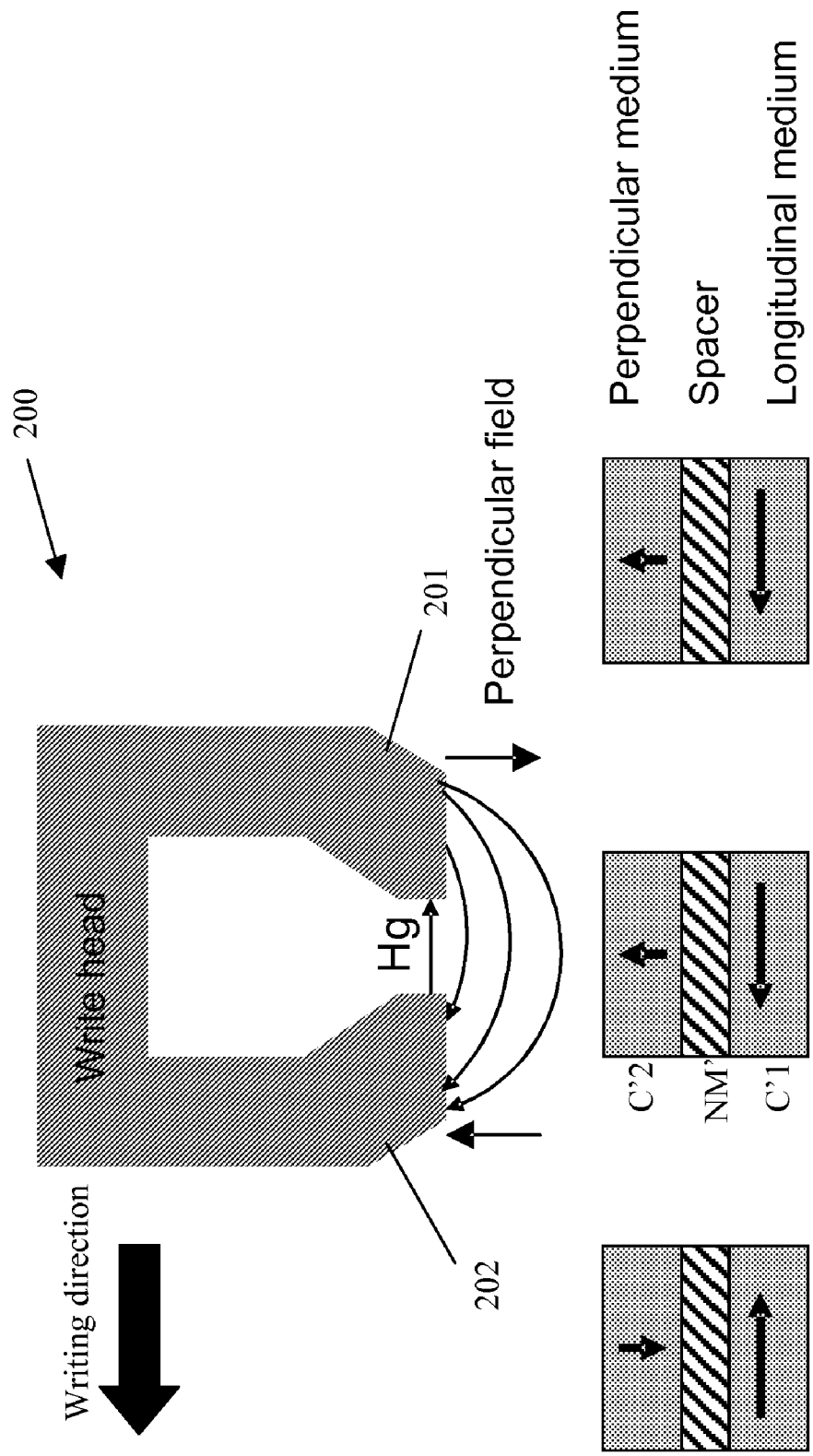

FIG. 7 illustrates a method for writing on a recording medium according to the invention.

In all the figures, common elements carry the same reference numbers.

Figure 1:
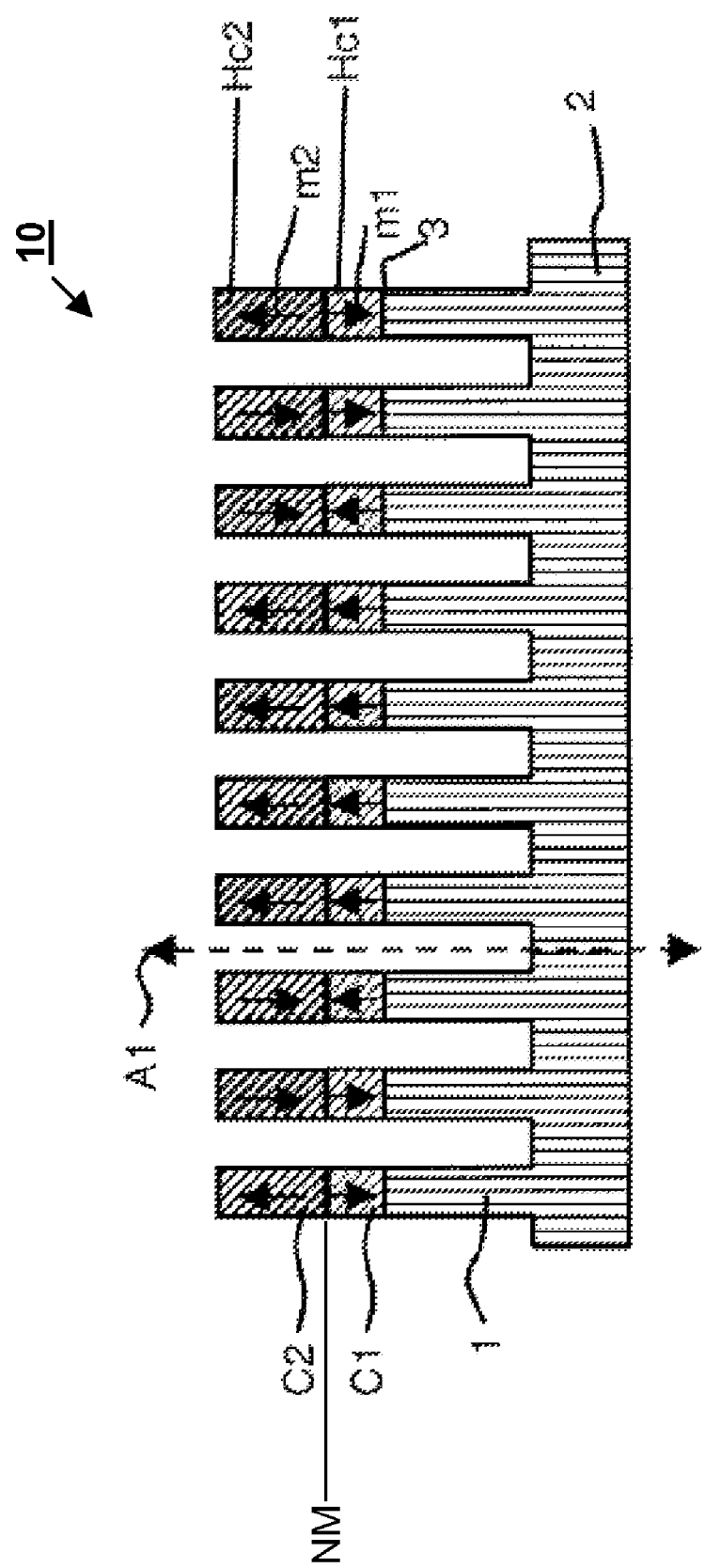
FIG. 1 is a simplified schematic representation of a magnetic recording medium according to the prior art.

FIG. 1 has already been described with reference to the prior art.

FIG. 2 is a simplified schematic representation of a magnetic recording medium 100 according to the invention.

This medium 100 is formed by a substrate 102 comprising an assembly of separated submicronic dots 101. A magnetic zone is disposed on the top 103 of each of the dots 101, two adjacent magnetic zones being separated by a space corresponding to the spacing of the dots. Each magnetic zone is comprised of the stacking of a first magnetic layer C'1 and a second magnetic layer C'2, the two magnetic layers being separated by a layer NM' made of a non-magnetic material. The first magnetic layer C'1 has a magnetocrystalline anisotropy axis (easy magnetization axis) disposed parallel to the substrate 102 (layer C'1 is called planar or longitudinal magnetization layer). The second magnetic layer C'2 has a magnetic anisotropy axis perpendicular to the substrate 102 (layer C'2 is called perpendicular or out-of-plane magnetization layer). The magnetization orientations of magnetic layers C'1 and C'2 of a magnetic zone allow data coded on four values to be represented.

Here, the planar magnetization layer C'1 is situated on the bottom of the stack: generally, the planar magnetization materials have higher magnetization than out-of-plane magnetization materials. Consequently, the perpendicular magnetization layer C'2 will preferentially be placed on top (the case of FIG. 2). However, it will be noted that it is also perfectly conceivable to place the planar magnetization layer on top of the perpendicular magnetization layer.

The thickness of the planar layer C'1 (typically varying from 1 nm to some tens of nm) must be optimized and depends on the lateral dimension of the dots, the flying height of the read head, and the thicknesses of the other constituents of the media. Different materials may be used to make this layer C'1. For example, these materials may be a CoPtCr alloy or a CoPtCrX alloy, X being Ta or P, or other materials used in longitudinal magnetization recording media. Any type of ferromagnetic material with high in-plane uniaxial anisotropy may also be used, for example alloys such as CoPt, CoPd or CoFeNi or chemically ordered alloys such as FePt or FePd. It will be noted that it is also possible to make a first synthetic magnetic layer formed by two antiparallel magnetization magnetic sublayers separated by a nonmagnetic sublayer NMS able to induce antiferromagnetic coupling between these two magnetic sublayers, made from a material such as Ru, as shown in FIG. 2a. The two sublayers are, for example, made of a CoFeCr alloy. Thus, instead of having a sin-gle magnetic layer, one has two magnetic layers (preferably of different thicknesses) that are antiferromagnetically coupled through a thin layer of ruthenium: the advantage of such a configuration is that it allows the volume of magnetic material to be increased and allows better thermal stability. An example of such a configuration may be a first magnetic, layer of CoFeCr alloy with a thickness of 2 nm on which a layer of Ru with a thickness of 0.9 nm is stacked, on which a second magnetic layer of CoFeCr alloy with a thickness of 4 nm is stacked.

The non-magnetic layer NM' inserted between the two layers C'1 and C'2 serves to ensure their magnetic decoupling. Different materials may be used to make this NM' layer. These may be Pt, Cu, or any other non-metallic metal such as Cr or Ru. One may also use an insulator such as $Al_2O_3$ or any other non-magnetic insulator such as $HfO_2$, $Ta_2O_5$, or MgO, of sufficient thickness (typically on the order of or greater than 1 nm) to ensure decoupling of the two magnetic layers C'1 and C'2 of the recording medium.

The perpendicular magnetization layer C'2 has a thickness that should be optimized according to the flying height of the read head, as in the case of the planar magnetization layer C'1. Also in this case, different materials may be used. These may be, for example, a CoPtCr alloy or a CoPtCrX alloy, X being Ta or P. One may also use multilayers of the cobalt/platinum (a layer of cobalt stacked with a layer of platinum) type of general form (Co/Pt)m as shown in FIG. 2a, the cobalt/palladium type of general form (Co/Pd)n or the cobalt/nickel type of general form (Co/Ni)p, m, n et p respectively corresponding to the number of repetitions of Co/Pt, Co/Pd and Co/Ni bilayers. One may also use any type of ferromagnetic material with high perpendicular-to-plane anisotropy, for example, alloys such as CoPt or CoPd or chemically ordered alloys such as FePt or FePd. In addition, it is possible to insert a thin soft planar magnetization SPM layer situated below or above (see FIG. 2a) the perpendicular-to-plane magnetic layer. The "softness" (or "hardness") of a magnetic layer is defined with relation to the value of the magnetic field necessary to reverse the magnetization of the layer. Such a magnetic layer will thus be regarded as "softer" if its coercive field is smaller. This planar magnetization layer is magnetically coupled by exchange to the perpendicular magnetization layer so as to form a magnetic partial-wall in the thickness of this bilayer formed by the combination of a perpendicular magnetization layer and a planar magnetization thin layer. The object of adding this planar magnetization layer is to lower the magnetic field necessary for reversing the magnetization of the perpendicular layer. In fact, when a field perpendicular to the plane is applied in order to reverse the magnetization of the perpendicular magnetization layer, this field exerts a significant torque on the magnetization of the planar layer since the magnetization of the latter is close to perpendicular to the direction of the field. Thus, the magnetization of the planar layer tends to rotate by leaving the plane in the direction of the applied perpendicular field, which initiates the reversal of the magnetization of the perpendicular magnetization layer coupled to it. Of course, the thickness of the soft layer must be less than the thicknesses of magnetic layers C'1 and C'2 so as to not overly disturb the field radiated by planar magnetization layer C'1. The use of such a layer may, for example, allow the perpendicular magnetic layer to be placed under the planar magnetic layer.

By way of example, a possible configuration combining the planar magnetization and perpendicular magnetization layers may be:

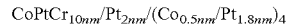

$$CoPtCr_{10nm}/Pt_{2nm}/(Co_{0.5nm}/Pt_{1.8nm})_4$$

where 10 nm designates the thickness of the planar magnetization layer C'1 made of a CoPtCr alloy, 2 nm designates the thickness of the NM' layer made of Pt, 0.5 nm and 1.8 nm respectively designate the thicknesses of layers of Co and Pt and 4 designates the number of repetitions of the Co/Pt bilayer forming the perpendicular magnetization layer C'2.

In configurations known from the prior art, discrete magnetic systems present either a magnetization perpendicular to the plane or a longitudinal magnetization.

Generally, the read head, by its operation principle, detects the out-of-plane component of the stray field (leakage field) by the recording medium. Magnetization perpendicular to the plane has the effect of locating the stray field lines right above the dots: this phenomenon is illustrated in FIG. 3b) which represents the stray field right above a dot with perpendicular magnetization calculated for different read head flying heights, respectively 15, and 30 nm (i.e., the vertical component of the stray field). In this geometry, a signal peak right above the dot is observed and the spaces between dots (i.e., the trenches between dots) are thus spaces lost for storage. On the other hand, in the case of planar magnetization layers, the stray fields are located at the ends of structures: this phenomenon is illustrated in FIG. 3a), which represents the vertical stray field of a dot with planar magnetization calculated for different read head flying heights, respectively 5, 15 and 20 nm. In this geometry, the maximum stray field is at the dot ends.

Thus, the read head essentially detects the transitions between dots for longitudinal magnetization media and the data bits of the dots themselves for perpendicular magnetization media.

The present invention proposes stacking planar and perpendicular layers on the same structure in order to better utilize all the surface of the recording medium. The approach proposed by this invention prevents the space above the trenches from being lost space from the point of view of data storage. In fact, the vertical components of the leakage fields generated by the planar structures will be situated for the most part right above the trenches, regions separating the bits, while the vertical components of the leakage fields radiated by the perpendicular structures will be situated for the most part right above the dots themselves. It will thus be possible to read the value of the bit of the perpendicular layer right above the dot, and the value of the planar bit right above the trenches on both sides of the dot. FIG. 4 presents the vertical components of the stray fields calculated for two dots with planar magnetization and for parallel (FIG. 4 a)) and antiparallel (FIG. 4b)) configurations of these two adjacent planar bits. It is observed that the form of the transition signal (boxed) between bits and, in particular, its parity clearly depend on their respective configurations. This signal is odd in the case of FIG. 4a) (parallel configuration) and even in the case of FIG. 4b) (antiparallel configuration). Subsequently we will see that one may also use this signal form to discriminate parallel or antiparallel configurations between two successive dots in the case of a recording medium according to the invention.

FIG. 5 represents a three-dimensional view of the vertical component Hz of the stray field of a set of four magnetic dots of a recording medium according to the invention comprising a planar layer C'1 with a thickness of 10 nm, a non-magnetic layer NM' with a thickness of 2 nm and a perpendicular layer C'2 with a thickness of 1 nm. As indicated by the intensity scale, the vertical component Hz of the leakage field is all the more intense since the mapping zone is either white (strong positive component) or black (strong negative component). The dots are square (30 nm on the side) and are spaced 15 nm apart. The perpendicular magnetization here is along the z axis and the planar magnetization is along the y axis. Each row of dots along the y axis belongs to the same reading track. The anisotropy of the planar layer is along these tracks, that is to say that the planar magnetization component is situated in the direction of scanning of the write head.

Vertically to the dots, a white zone (corresponding to an intense stray field) is observed: the positive stray fields of the perpendicular layer situated above the stack are relatively strong. Between each dot, along the track (i.e., along the y axis), black zones (also corresponding to an intense leakage field) are observed due to the planar magnetization layer of the dots on both sides of the trench. Thus, storage may be optimized on the available space formed by a dot and a trench. We note that the absence of signal in the zone between each track along the x axis may be used as a head guiding source for the writing/reading head (tracking). In fact, the use of discrete systems as storage media necessitates perfect guiding of the head, since the latter must send write field pulses to the specific locations of the dots.

It will be noted that it is also possible to add a third magnetic layer C'3 (see FIG. 2a) onto the dot under the first and second magnetic layers, this layer having a magnetization parallel to the plane of the substrate and perpendicular to the orientation of magnetization of the first layer C'1; in other words, with reference to FIG. 5, the magnetization of this layer would be along the x axis: such a configuration would allow the zones situated between each adjacent dot belonging to two consecutive tracks to be advantageously utilized. In such a configuration, the zone situated along the tracks (mentioned above) allowing guiding of the head is much more reduced but it remains, however, a part of this zone that is practically without a radiated field corresponding to the central zone C of the mapping represented in FIG. 5. These zones correspond to the intersection of trenches oriented along the x axis and the trenches oriented along the y axis.

FIG. 5 also represents a section of the component Hz of the stray field along a line passing by the middle of the dots at a height of 4 nm above the dots. The net asymmetry of this section Hz(y) is used to detect the planar signal, as we are going to see with reference to FIGS. 6a) to 6c).

FIGS. 6a) to 6c) each represent a stray field signal form (vertical component of the radiated field) calculated in the case of two successive dots of the same track on a recording medium according to the invention, for three different configurations:

A first configuration (FIG. 6a)) for which the magnetizations of the planar and perpendicular layers of two successive dots are parallel;
A second configuration (FIG. 6b)) for which the magnetizations of the planar layers of two successive dots are parallel and the magnetizations of the perpendicular layers of two successive dots are antiparallel;
A third configuration (FIG. 6c)) for which the magnetizations of the planar and perpendicular layers of two successive dots are antiparallel.

It will be noted that the signal form of FIG. 6a) is substantially identical to the signal form of FIG. 5, the two dots presenting the same magnetization configuration.

The perpendicular layers of two successive dots have thicknesses of 1 nm and the planar layers have thicknesses of 10 nm. The non-magnetic layers have thicknesses of 2 nm. The flying height is 4 nm. The dots are square with 15 nm on the side and are separated by 15 nm.

As mentioned previously, reading the data from the bit contained in the perpendicular layer (corresponding to the vertical component of the field radiated by the perpendicular layer) is done right above each dot by measuring the stray field: in fact, an upward or downward signal peak is observed according to the upward or downward direction of the magnetization. These peaks directly correspond to the value of the bit.

For the planar layer, the parity of the transition signal (boxed in dotted lines in FIGS. 6a) to 6c)) will allow values to be given to the adjacent bits.

Thus, when the bits (planar magnetizations) of the two successive planar layers are antiparallel, the transition signal is substantially even. This is the case of the configuration illustrated in FIG. 6c).

Inversely, when the bits of two successive planar layers are parallel, the transition signal is odd. This is the case with the configurations illustrated in FIG. 6a) or 6b).

Another way to characterize these signals consists of considering their slope (and not the parity of the signals).

Thus, it is observed that for two antiparallel planar magnetizations, (curve 6c)), the signal presents almost no slope right above the middle of the trenches (almost flat signal).

On the other hand, it is observed that for two parallel planar magnetizations (curves 6a) and 6b)), the signal varies very sharply and presents a significant slope right above the middle of the trenches.

The transformation of the analog signal of the read head into a digital signal necessitates the implementation of a suitable decoder utilizing an algorithm of the Viterbi decoder type. The latter may use the characteristics given above, that is, that the bits associated with the out-of-plane magnetization layers will be extracted from the value of the analog signal received right above the dots while the bits associated with the planar magnetization layers will be extracted from the slope or parity of the analog signal received right above the trenches separating the dots.

Concerning addressing (writing) of the planar and longitudinal states, it is, in addition, possible to use a conventional write head suitable for planar magnetization media such as the head 200 illustrated in FIG. 7. This head 200 that is suitable for longitudinal recording media is a miniature electromagnet comprising two polar pieces (one front polar piece 201 and one rear polar piece 202) and a Cu coil (not represented) of micrometric dimensions. As illustrated in FIG. 7, the profile of the stray field in the gap is almost exclusively planar, while its orientation is perpendicular under write poles 201 and 202.

Thus, the planar layer C'1 is addressed (i.e., orientation of magnetization in one direction or the other) during the passage of the gap right above the dot while the perpendicular layer C'2 is addressed during passage of the rear pole 202 right above the dot. Thus, the profile of the field radiated by the read head permits all the states (perpendicular under the poles and planar in the gap) to be addressed. In each of the cases, addressing is done by application of a magnetic field greater than the coercive field of the layers to address.

Beyond 500 Gbit/inch$^2$, discrete media will become indispensable for ultra-high density magnetic storage. The use of discrete media for perpendicular recording allows storage densities greater than terabit per square inch to be expected.

The medium according to the invention relates to magnetic recording on discrete media and is based on systems combining planar and perpendicular layers. The specific feature of the invention relies on increasing the useful storage surface in discrete media by taking advantage of the space between dots. This is done by associating on each dot a layer of out-of-plane magnetization material whose stray field is situated essentially vertically from the dot, with a planar magnetization layer oriented along the track whose stray field is essentially located in the space separating adjacent dots along the track. Thus, making multi-level systems from magnetic materials with anisotropies oriented in different directions on discrete media is a particularly interesting path for obtaining increased density of data stored by a factor of 2 with relation to the currently considered discrete media (dot with one magnetic layer), a better use of available disk space as well as a simplified implementation in the field of both media writing and reading.

The invention claimed is:

1. A magnetic recording medium comprising:
an assembly of magnetic zones disposed on a substrate, each magnetic zone comprising at least a first and a second stacked magnetic layer separated from each other by a non-magnetic layer, wherein said non-magnetic layer is a layer configured to provide magnetic decoupling of said first and second magnetic layers; wherein said first magnetic layer presents magnetization substantially oriented parallel to the plane of said substrate; wherein said second magnetic layer presents magnetization substantially oriented perpendicular to the plane of said substrate, and wherein said magnetic orientations of said first and second magnetic layers allow data coded on four values per zone to be represented.

2. The magnetic recording medium according to claim 1, wherein said second magnetic layer is situated above said first magnetic layer.

3. The magnetic recording medium according to claim 1, wherein said first magnetic layer is a monolayer made from one of the following alloys:
a CoPt or CoPd or CoFeNi alloy;
a FePt or FePd chemically ordered alloy;
a CoCr or CoPtCr or CoPtCrX alloy where X designates Ta or P or B.

4. The magnetic recording medium according to claim 1, wherein said first magnetic layer is formed by two antiparallel magnetization magnetic sublayers separated by a non-magnetic sublayer made of a material that is able to induce antiferromagnetic coupling between said two adjacent sublayers.

5. The magnetic recording medium according to claim 4, wherein the thicknesses of said magnetic sublayers are different.

6. The magnetic recording medium according to claim 4, wherein the non-magnetic sublayer is made of Ru.

7. The magnetic recording medium according to claim 1, wherein said second magnetic layer is a magnetic multilayer.

8. The magnetic recording medium according to claim 7, wherein said magnetic multilayer is a cobalt/platinum multilayer of general form (Co/Pt)m or a cobalt/palladium multilayer of general form (Co/Pd)n or a cobalt/nickel multilayer of general form (Co/Ni)p, m, n and p designating natural numbers respectively corresponding to the number of respective repetitions of a Co/Pt, Co/Pd or Co/Ni bilayers.

9. A magnetic recording medium according to claim 1, wherein said second magnetic layer is a monolayer made from one of the following alloys:
a CoPt or CoPd alloy;
a FePt or FePd chemically ordered alloy;
a CoCr or CoPtCr or CoPtCrX alloy where X designates Ta or P or B.

10. The magnetic recording medium according to claim 1, wherein said non-magnetic layer is made from a material selected from among the non-magnetic metals comprising Pt, Cr, Ru or Cu or oxides comprising $Al_2O_3$, MgO, $HfO_2$ or $Ta_2O_5$.

11. The magnetic recording medium according to claim 1, wherein said first layer is a layer of CoPtCr, said non-magnetic layer is a layer of Pt and said second layer is a multilayer of Co/Pt.

12. The magnetic recording medium according to claim 1, wherein each magnetic zone comprises an inplane magnetized soft magnetic layer with a thickness of less than the thicknesses of said first and second magnetic layers, said soft magnetic layer being situated above or below said second magnetic layer and being magnetically coupled to said second magnetic layer by exchange to facilitate writing in said second magnetic layer.

13. The magnetic recording medium according to claim 1, wherein said substrate comprises an assembly of dots, each magnetic zone being disposed on the top of a dot.

14. The magnetic recording medium according to claim 1, comprising a plurality of spaced and concentric reading/writing tracks on which said magnetic zones are positioned.

15. The magnetic recording medium according to claim 14, wherein the magnetization of each first magnetic layer is oriented along a direction of scanning of a write head.

16. The magnetic recording medium according to claim 1, wherein each of said magnetic zones comprises a third layer presenting magnetization oriented substantially parallel to the plane of said substrate and perpendicular to the magnetization orientation of said first layer.

17. A method of reading a magnetic recording medium according to claim 1 using a read head, the method comprising:
passing said read head above a succession of adjacent magnetic zones;
detecting by said read head a vertical component of a field radiated during said passing;
determining a value of a bit corresponding to said second magnetic layer of the different successive magnetic zones from a form of the signal of the vertical component obtained above said different successive magnetic zones;
determining a value of a bit corresponding to said first magnetic layer of the different successive magnetic zones from a form of the signal of the vertical component obtained between the different successive magnetic zones.

18. A method of magnetizing magnetic zones of a recording medium according to claim 1 by a write head comprising a front polar piece and a rear polar piece, said method comprising, for each of said zones to address:
magnetizing said first magnetic layer during passage of a gap of the write head above said magnetic zone;
magnetizing said second magnetic layer during passage of the rear polar piece above said magnetic zone.

* * * * *